United States Patent
Glickman et al.

(10) Patent No.: US 10,209,762 B2
(45) Date of Patent: Feb. 19, 2019

(54) SELECTIVELY POWERED LAYERED NETWORK AND A METHOD THEREOF

(71) Applicants: Eran Glickman, Rishon le Zion (IL); Ron Bar, Ramat Hasharon (IL); Benny Michalovich, Raanana (IL)

(72) Inventors: Eran Glickman, Rishon le Zion (IL); Ron Bar, Ramat Hasharon (IL); Benny Michalovich, Raanana (IL)

(73) Assignee: NXP USA, Inc., Austin, TX (US)

( * ) Notice: Subject to any disclaimer, the term of this patent is extended or adjusted under 35 U.S.C. 154(b) by 74 days.

(21) Appl. No.: 15/024,443

(22) PCT Filed: Sep. 27, 2013

(86) PCT No.: PCT/IB2013/058937
§ 371 (c)(1),
(2) Date: Mar. 24, 2016

(87) PCT Pub. No.: WO2015/044718
PCT Pub. Date: Apr. 2, 2015

(65) Prior Publication Data
US 2016/0246358 A1 Aug. 25, 2016

(51) Int. Cl.
*G06F 1/32* (2006.01)
*G06F 13/40* (2006.01)

(52) U.S. Cl.
CPC .......... *G06F 1/3287* (2013.01); *G06F 1/3209* (2013.01); *G06F 1/3253* (2013.01);
(Continued)

(58) Field of Classification Search
CPC .... G06F 1/3287; G06F 1/3203; G06F 1/3209; G06F 1/3253; G06F 13/40; Y02B 60/1228
See application file for complete search history.

(56) References Cited

U.S. PATENT DOCUMENTS

| 8,250,411 B2 | 8/2012 | Williams et al. |
| 2006/0171329 A1 | 8/2006 | Ying |
| (Continued) | | |

OTHER PUBLICATIONS

International Search Report for the International application No. PCT/IB2013/058937 dated Jun. 25, 2014.

*Primary Examiner* — Jaweed A Abbaszadeh
*Assistant Examiner* — Gayathri Sampath

(57) ABSTRACT

A layered network (10; 11; 12) to provide offload of data in a communication processor (100; 110; 120). The layered network (10; 11; 12) includes a first set ($S_1$) of network elements at a first layer (L1) and a second set ($S_2$) of one or more network elements at a second layer (L2). The network elements of the first set ($S_1$) are configured for processing incoming data and the network elements of the second set ($S_2$) of one or more network elements at the second layer (L2) are configured to process intermediate data received from the first set ($S_1$) of network elements. The network elements of a particular subset ($S_{i1}$) of the network elements of the first set ($S_{i1}$) of network elements are connected to only a particular network element ($E_{i2}$) of the second set ($S_2$) to transfer the incoming data processed by the network elements of the particular subset ($S_{i1}$) to the particular network element ($E_{i2}$) of the second set ($S_2$). The layered network (10; 11; 12) further includes a powering controller (25) configured to, during offload of the data, put a particular network element ($E_{i2}$) of the second set ($S_2$) at the second layer (L2) in an on state only if at least a particular network element ($E_{i1}$) of the particular subset ($S_{i1}$) of the network elements of the first set ($S_1$) at the first layer (L1) is in an on state and at least one of the network elements of the first set ($S_1$) is in an off state. The powering controller (25) is configured to discriminate between chains of network elements formed by at least network elements of the first set ($S_1$) and network elements of the second set ($S_2$) and to have (Continued)

a chain in an on state if a first network element of the chain at a highest layer hierarchy is in an on state.

2 Claims, 6 Drawing Sheets

(52) U.S. Cl.
CPC ...... *G06F 13/40* (2013.01); *G06F 2213/0038* (2013.01); *Y02D 10/151* (2018.01)

(56) References Cited

U.S. PATENT DOCUMENTS

| | | | |
|---|---|---|---|
| 2007/0198863 A1* | 8/2007 | Bose | G06F 1/206 |
| | | | 713/300 |
| 2008/0016511 A1 | 1/2008 | Hyder et al. | |
| 2008/0114998 A1* | 5/2008 | Ferentz | H04L 12/12 |
| | | | 713/324 |
| 2009/0106436 A1 | 4/2009 | Andersson et al. | |
| 2010/0131669 A1 | 5/2010 | Srinivas et al. | |
| 2010/0165897 A1* | 7/2010 | Sood | G06F 1/3209 |
| | | | 370/311 |
| 2011/0320588 A1* | 12/2011 | Raleigh | H04W 36/245 |
| | | | 709/224 |
| 2012/0170592 A1* | 7/2012 | Dudkowski | H04L 12/12 |
| | | | 370/419 |
| 2012/0310558 A1 | 12/2012 | Taft | |

\* cited by examiner

SELECTIVELY POWERED LAYERED NETWORK AND A METHOD THEREOF

FIELD OF THE INVENTION

This invention relates to a layered network and to a method of controlling a layered network in a communication processor. The invention further relates to a layered offload network and to a layered debug network, and to a communication processor including any of said layered offload network and/or layered debug network. Additionally the invention relates to a wired or wireless communication system including any of said layered offload/debug networks or the communication processor.

BACKGROUND OF THE INVENTION

In order to increase the performance of communication processors, hardware accelerators such as offload networks may be typically used. Offload networks are capable of processing data that otherwise would be processed in a processing unit in the communication processor thereby reducing the performance of the processing unit. Offload networks have typically a layered architecture, i.e. a series of network elements may be instantiated between different modules in the communication processor (e.g. IP blocks communicating with the processing unit in the communication processor) to create an offload network that can operate at high speed. The layered architecture may be a modular layered architecture which provides a considerable flexibility of re-using the offload layered network for different applications. Thus, the layered offload network may be used in general purpose communication processors or may be customized for a particular application. The network elements of the series of network elements in successive layers collect trace messages from remote sources and provide synchronization, arbitration and storage of the trace messages. The series of network elements forms a chain of network elements to aggregate data offloaded from the processing unit in the communication processor. Once that data is offloaded from the processing unit in the communication processor, the offloaded data is received from a first set of network elements at a first layer of the layered offload network. Once the offloaded data is processed by the network elements at the first layer, the processed offloaded data is received by a second set of network elements at a second layer and so on until a final network element at a last layer of the layered offload network aggregates all processed offloaded data through the layers of the layered offload network and provides an output of the layered offload network. A number of network elements at the first layer may be greater than a number of network elements at the second layer and the number of network elements at the second layer may be greater than a number of network elements at the third layer until a single network element at the last layer is reached. The network elements of the layered offload network may also provide conversion of the offloaded processed data into various bus formats to allow the output of the layered offload network to access an external memory. The layered offload network may thus provide an alternative path for the communication processor in which the data is not sent directly from the processing unit of the communication processor to the external memory but it is offloaded from the layered offload network and sent to the external memory via the output of the layered offload network.

One of the problems associated with existing layered offload networks is that the increase of performance of the communication processor comes at the expenses of substantial extra power consumption. In fact, in order to offload data from the processing unit in the communication processor, the layered offload network needs to be fully powered-on to ensure offloading of the data and thereby releasing the processing unit from the burden of processing a larger amount of data. In fact the network elements of existing layered offload networks are typically connected to a master power down which turns on or turns off all network elements in the layered offload network. If the layered offload network is designed to work at high clock speeds as it may be usually required, the power consumption of the fully turned on layered offload network during offloading of the data may exceed the maximum power consumption allowed in the particular application for which the layered offload network may be customized.

SUMMARY OF THE INVENTION

The present invention provides a layered network that provides offload of data in a communication processor, a communication processor including the layered network, a wired or wireless communication system including said layered network or said communication processor. The present invention further provides a method of controlling a layered network in a communication processor and a computer program product including instructions to cause a computer system to perform said method.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

Figure 1:
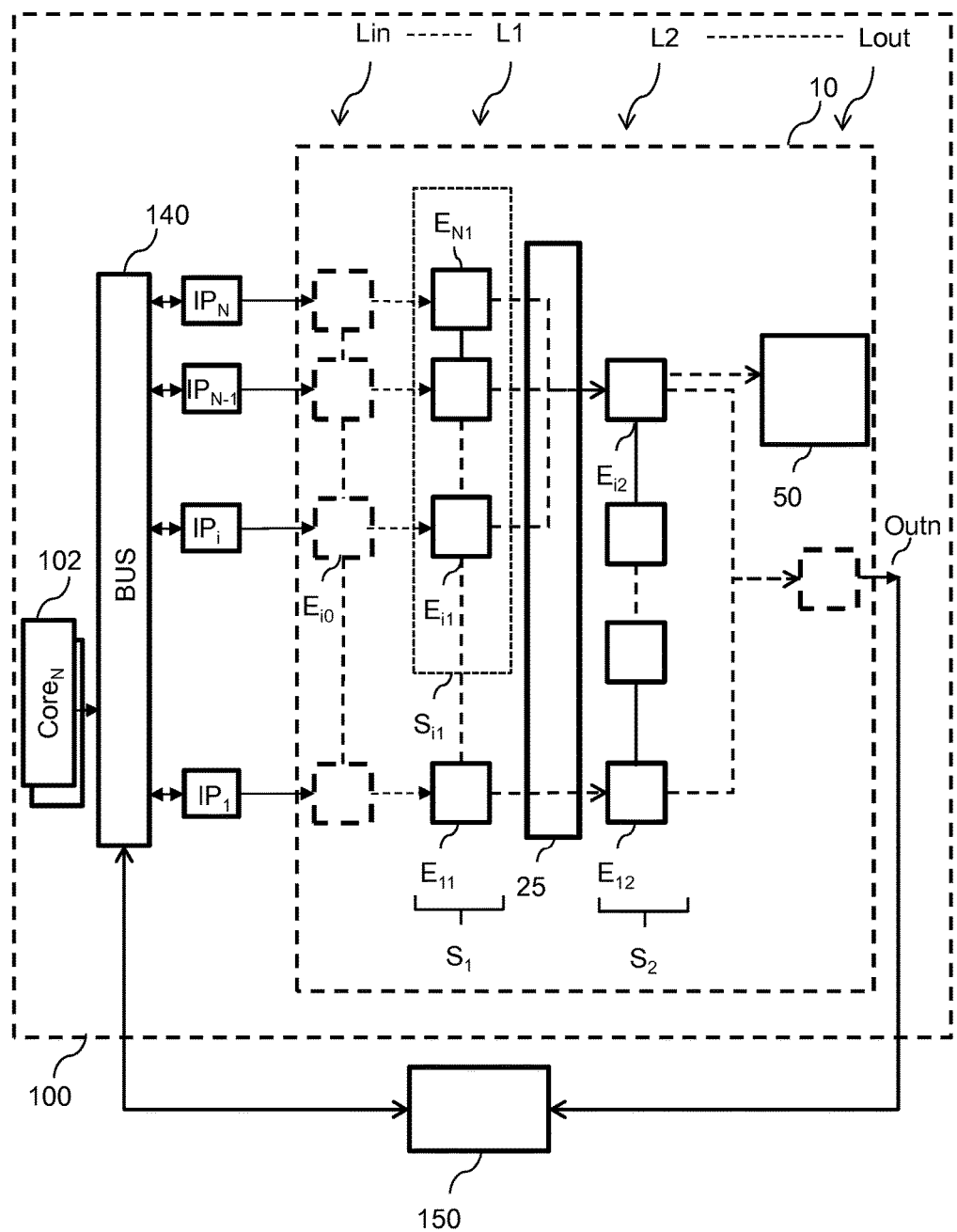
FIG. 1 schematically shows an example of an embodiment of a layered network embedded in a communication processor, FIG. 2 schematically shows a further example of an embodiment of a layered network embedded in a communication processor, FIG. 3 schematically shows another example of an embodiment of a layered network embedded in a communication processor, FIG. 4 schematically shows an example of an adaptive power controller used in the layered network of FIG. 3 and an example of input coded frame, FIG. 5 schematically shows an example of a power budget algorithm unit used in the adaptive power controller shown in FIG. 4, and FIG. 6 schematically shows a flow chart of a method of controlling a layered network in a communication processor.

FIG. 1 schematically shows an example of an embodiment of a layered network 10 embedded in a communication processor 100. The layered network 10 may be a layered offload network 10 that provides offload of data in the communication processor 100 during a normal mode of operation of the communication processor 100, i.e. during a functional mode of operation of the communication processor 100. The layered network 10 may be a layered debug network to perform diagnostic or testing operations in the communication processor 100 when the communication processor 100 works in a test mode of operation, i.e. when the communication processor 100 or constituent parts of the communication processor 100 are tested for debugging the communication processor 100. We will refer in the rest of this document and if not otherwise specified, to the layered network 10 as to the layered offload network 10. The communication processor 100 may be a general purpose communication processor 100 which may support a variety of communication systems. The communication system supported by the communication processor 100 may be a wired or wireless communication system in which for example audio, video or other data is processed. The communication system supported by the communication processor 100 may be for example an Ethernet system. The layered offload network 10 shown in FIG. 1 is embedded in the communication processor 100. The layered offload network 10 may be integrated in the communication processor 100 in the same chip, for example in order to obtain a system on chip (SoC) based communication processor 100. Alternatively the layered offload network 10 may be external to the communication processor 100 and integrated in a different chip than a chip wherein the communication processor 100 is integrated. The communication processor 100 may include one or more core processors 102 to process data, a central bus 140 (e.g. a central fabric with some processing power capabilities) and one or more IP units, $IP_1$ to $IP_N$, to perform various functions. For example the one or more IP units, $IP_1$ to $IP_N$, may handle communication protocols such as Ethernet protocol and/or perform controlling functions or memory access functions. The communication processor 100 may share a memory unit 150 with the layered offload network 10. The memory unit 150 may be embedded in the communication processor 100, or as shown in FIG. 1, the memory unit 150 may be external to the communication processor 100. The memory unit 150 may be used to store data processed by the communication processor 100 via the central bus 140 or processed by the layered offload network 10. Each of the one or more core processors 102 of the communication processor 100 may have a separate cache memory (not shown in FIG. 1). A change occurring in the shared memory unit 150 may be replicated into each one of the separate cache memories such that changes in the shared memory unit 150 may be propagated through the communication processor 100 in a timely fashion. Cache coherency ensures that the memory unit 150 may be shared between the one or more core processors 102 efficiently. In other words the central bus 140 processes coherent data, i.e. data which needs to be consistent through each one of the separate cache memories of the shared memory unit 150. On the contrary data offloaded in the communication processor 100 to the layered offload network 10 and processed in the layered offload network 10 is non-coherent data, i.e. data that does not need to be copied from the memory unit 150 into local cache memories.

The layered offload network 10 includes a first set $S_1$ of network elements at a first layer L1 of the layered offload network 10. The network elements of the first set $S_1$ are configured to process incoming data. In the example of FIG. 1 the data offloaded in the communication processor 100 is offloaded via the one or more IP units, $IP_1$ to $IP_N$, to corresponding network elements $E_{i0}$ of the layered offload network 10 interfacing the one or more IP units, $IP_1$ to $IP_N$, with the network elements of the first set $S_1$, $E_{11}$ to $E_{N1}$. One or more input interfacing layers may be arranged between the first layer L1 and the one or more IP units, $IP_1$ to $IP_N$. In FIG. 1 only one input interfacing layer Lin is shown. The network elements $E_{i0}$ at the input interfacing layer Lin offload and process the data in the communication processor 100 coming from the corresponding one or more IP units, $IP_1$ to $IP_N$. The offloaded data processed by network elements $E_{i0}$ at the input interfacing layer Lin is received as incoming data by the network elements, $E_{11}$ to $E_{N1}$, at the first layer L1. The layered offload network 10 further includes a second set $S_2$ of network elements at the second layer L2, i.e. the network elements $E_{12}$, $E_{i2}$, etc. The network elements of the second set $S_2$ at the second layer L2 are configured to process intermediate data received from the first set $S_1$ of network elements, $E_{11}$ to $E_{N1}$. The network elements, $E_{11}$ to $E_{N1}$, of the first set $S_1$ are hardware blocks capable to collect incoming data, i.e. data offloaded from the one or more IP units, $IP_1$ to $IP_N$, and processed in the one or more input interfacing layers. Similarly, the network elements of the second set $S_2$ are hardware blocks capable to collect intermediate data coming from the network elements, $E_{11}$ to $E_{N1}$, of the first set $S_1$. The network elements of the first set $S_1$ and of the second set $S_2$ provide synchronization, arbitration and/or storage of the incoming data and the intermediate data. The network elements of the first set $S_1$ and of the second set $S_2$ may provide conversion of data into various bus formats to access, via one or more output interfacing layers subsequent to the second layer L2, the memory unit 150. One or more output interfacing layers may be arranged between the second layer L2 and a layered offload network output Outn. In FIG. 1 only one output interfacing layer Lout is shown. The layered offload network 10 includes a powering controller 25 to have in an on or off state the network elements of the second set $S_2$ at the second layer L2. The powering controller 25 is configured to have in an on state, during offload of data, a particular network element $E_{i2}$ of the second set $S_2$ at the second layer L2 only if at least a particular network element $E_{i1}$ of a particular subset $S_{i1}$ of network elements of the first set $S_1$ at the first layer L1 is in an on state and one of the network elements of the first set $S_1$ is in an off state. The network elements of the particular subset $S_{i1}$ at the first layer L1 are all connected to only the particular network element $E_{i2}$ of the second set $S_2$ at the second layer L2. The powered off network element of the first set $S_1$ may belong or may not belong to the particular subset $S_{i1}$. Since at least a network element of the first set $S_1$ is in an off state while the particular network element $E_{i2}$ of the second set $S_2$ and at least a particular network element $E_{i1}$ of a particular subset $S_{i1}$ are in an on state, power consumption of the layered offload network 10 and of the communication processor 100 wherein the layered offload network 10 may be embedded is at least reduced compared to a situation in which all network elements in the layered offload network 10 are turned on. More than one network element of the first set $S_1$ may be powered off while the particular network element $E_{i2}$ of the second set $S_2$ is in an on state. In this latter case the power consumption of the layered offload network 10 and of the communication processor 100 may be further reduced. Existing layered offload networks have typically a master power controller unit that indiscriminately turns-on all network elements in the existing layered offload networks during offload of data in a communication processor and indiscriminately turns-off all network elements in the existing layered offload networks when offload of data is not performed. The proposed invention instead includes a powering controller 25 which discriminates between the network elements in the layered offload network 10 and puts in an on state a particular network element $E_{i2}$ of the second set $S_2$ at the second layer only if at least one of the network elements of the first set $S_1$ connected to particular network element $E_{i2}$ is turned on. In this way a chain of turned on network elements is established which offloads the data in the communication processor 100 and transfers the processed offloaded data down in the layer hierarchy of the layered offload network 10, i.e. from the input interfacing layer Lin through the first layer L1 and the second layer L2 to the output interfacing layer Lout. In a similar way a chain of powered-off network elements through the layer hierarchy of the layered offload network 10 may be established from the input interfacing layer Lin through the first layer L1 and the second layer L2 to the output interfacing layer Lout. In other words, the powering controller 25 may be configured to discriminate between chains of network elements formed by at least network elements of the first set $S_1$ and network elements of the second set $S_2$ and to have a chain in an on state if the first network element of the chain is in an on state. The first network element of the chain is the network element at the highest level of the chain, i.e. at the first layer L1 in the example of the layered offload network 10 with only the first layer L1 and the second layer L2. If there are more than two layers of network elements as shown in FIG. 1, the first network element at the highest level of the chain is a network element at the input interfacing layer Lin. In this latter case the chain includes all powered on network elements at the input interfacing layer Lin and at the output interfacing layer Lout which are connected in series along the chain to the network elements at the first layer L1 and at the second layer L2.

The layered offload network 10 shown in FIG. 1 further includes an adaptive power controller 50. The adaptive power controller 50 is configured to keep in an on state the particular network element $E_{i2}$ of the second set $S_2$ at the second layer L2 and the at least a particular network element $E_{i1}$ of the particular subset $S_{i1}$ of network elements at the first layer L1 if a combined power consumption of the particular network element $E_{i2}$ of the second set $S_2$ at the second layer L2 and the at least a particular network element $E_{i1}$ of the particular subset $S_{i1}$ is within a maximum power budget of the layered offload network 10. In other words, the particular network element $E_{i2}$ at the second layer L2 and the particular network element $E_{i1}$ at the first layer L1 are kept in an on state if the combined power consumption of the particular network element $E_{i2}$ of the second set $S_2$ at the second layer L2 and of the at least a particular network element $E_{i1}$ of the particular subset $S_{i1}$ of network elements at the first layer L1 summed to the remainder power consumption of the layered offload network 10 is lower than an allowed maximum power budget for the particular application in which the layered offload network 10 is used. In this way the total power consumption of the layered offload network 10 may be adapted to the requirements of the application in which the layered offload network 10 is used.

The adaptive power controller 50 may be further configured to turn-off said chain formed by the particular network element $E_{i2}$ of the second set $S_2$ at the second layer L2 and the at least a particular network element $E_{i1}$ of the particular subset $S_{i1}$, if the combined power consumption of the particular network element $E_{i2}$ of the second set $S_2$ at the second layer L2 and of the at least a particular network element $E_{i1}$ of the particular subset $S_{i1}$ of network elements at the first layer L1 exceeds the maximum power budget of the layered offload network 10 and if the at least a particular network element $E_{i1}$ of said particular subset $S_{i1}$ and the particular network element $E_{i2}$ of the second set $S_2$ were not already kept in an on state by the adaptive power controller 50 but turned on during an initialisation of the layered offload network 10. In this way only chains of network elements initialized and turned on once during a start-up of the layered offload network 10 may be turned off if the power consumption of said chains summed to the remainder power consumption of the layered offload network 10 is higher than the maximum power budget allowed by the application. On the contrary chains of network elements that were previously kept in an on state by the adaptive power controller 50 because their power consumption was not exceeding the maximum power budget allowed in the layered offload network 10, may not be turned off by the adaptive power controller 50. By keeping in an on state already approved chains of network elements to process and transfer the offloaded data and by de-activating chains that increase the power consumption of the layered offload network 10 above the maximum allowed power budget in the layered offload network 10, the adaptive power controller 50 optimizes the power consumption in the layered offload network 10 and thus in the communication processor 100 wherein the layered offload network 10 may be embedded.

As said, the layered offload network 10 may have one or a plurality of input interfacing layers interfacing the network elements, $E_{11}$ to $E_{N1}$, at the first layer L1, to the one or more IP units, $IP_1$ to $IP_N$. The layered offload network 10 may also have one or a plurality of further output interfacing layers interfacing the network elements, $E_{12}$, $E_{i2}$, etc., at the second layer L2 to an output of layered offload network 10.

Figure 2:
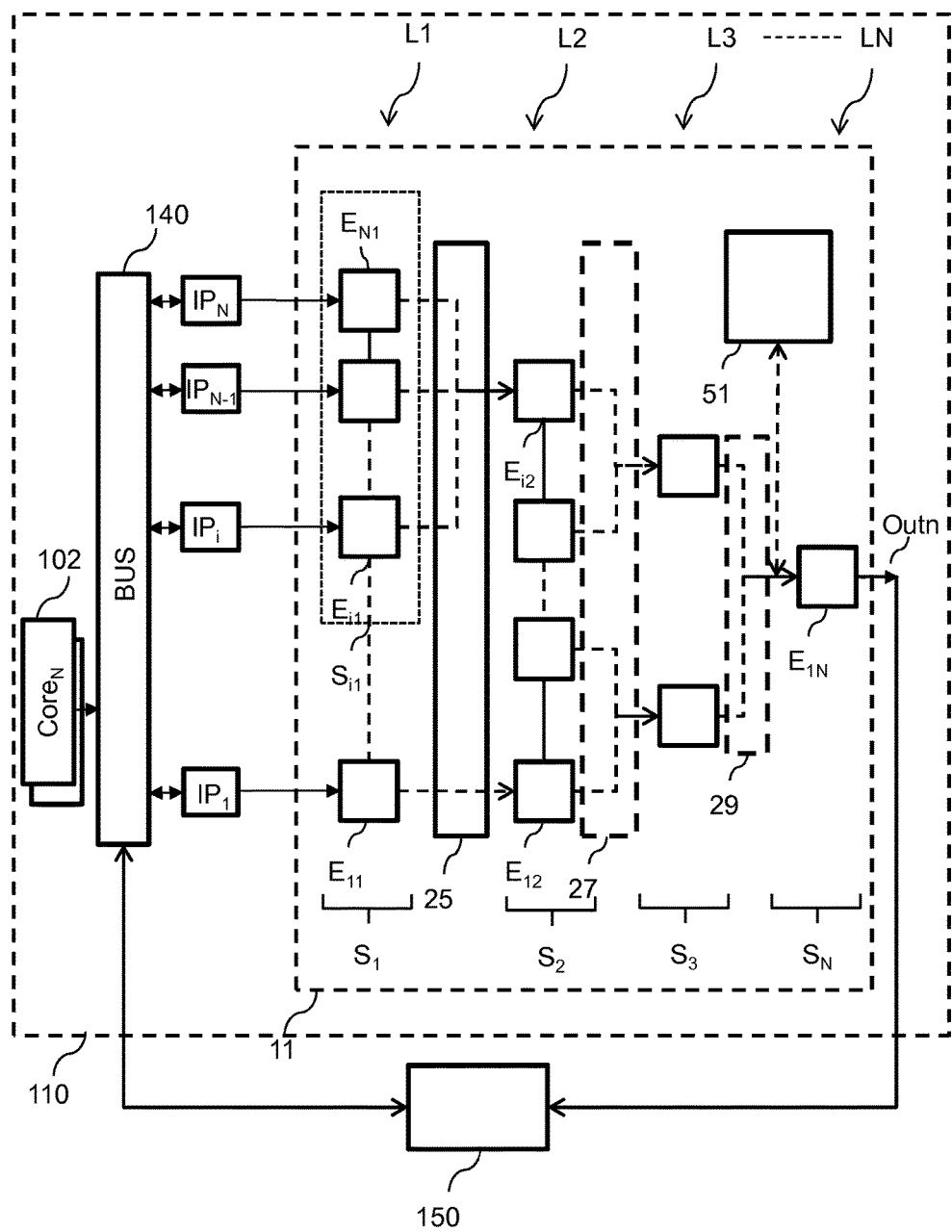

Alternatively in another embodiment shown in FIG. 2, the network elements, $E_{11}$ to $E_{N1}$, of the first set $S_1$ a the first layer L1 may have inputs to directly receive and process data offloaded in the communication processor 110 via the one or more IP units, $IP_1$ to $IP_N$. As shown for example in FIG. 2 the layered offload network 11 has a plurality of sets, $S_3$ to $S_N$, of network elements at a corresponding plurality of further layers, L3 to LN, subsequent to the second layer L2. A third set of network elements $S_3$ is at a correspondent third layer L3; a fourth set $S_4$ of network elements would be at a correspondent fourth layer L4, and so on. The layered offload network 11 shown in FIG. 2 further includes a last network element $E_{1N}$ at the last layer LN of the corresponding plurality of further layers. The last network element $E_{1N}$ is configured to receive the data processed in the network elements at layers preceding the last layer LN and to provide an output signal of the layered offload network 11 to the memory unit 150 to store the data processed in the layered offload network 11 in the memory unit 150. By having a plurality of sets, $S_3$ to $S_N$, at a corresponding plurality of further layers, L3 to LN, subsequent to the second layer L2, the layered offload network 11 shown in FIG. 2 may have an increased speed and provide an increased buffering of data compared to a layered offload network with less layers, thereby further decreasing the burden in the central bus 140 or in the one or more core processors 102 caused by processing large amount of non-coherent data.

In another alternative embodiment not shown in the Figures, the second set $S_2$ of one or more network elements, $E_{12}$, $E_{i2}$, etc., may have only one network element providing the layered network output Outn. The layered network output Outn provides output data to the memory unit 150.

The memory unit 150 may be configured to store the output data processed in the layered offload network 11. In this embodiment, the second layer L2 corresponds to the last layer LN of the layered offload network 11 and the only one network element corresponds to the last network element $E_{1N}$ of the layered offload network 11.

What has been so far described for the layered offload network 10 of FIG. 1, i.e. for a layered offload network with two sets $S_1$ and $S_2$ of network elements at two corresponding layers L1 and L2, can be extended to the multi-sets multi-layers layered offload network illustrated in FIG. 2 in which the first set $S_1$ of network elements, $E_{11}$ to $E_{N1}$, at the first layer L1, processes incoming data directly received and offloaded from the one or more IP units, $IP_1$ to $IP_N$. In the layered offload network 11 of FIG. 2, the powering controller 25 is arranged between the first set $S_1$ and the second set $S_2$ as in FIG. 1. In addition to the power controller 25, power controllers 27 and 29 are arranged between the second set $S_2$ and the third set $S_3$, and between the third set $S_3$ and the last set $S_N$ respectively. The power controllers 27 and 29 are configured, similarly to the power controller 25, to have on, during the offload of data, a particular network element of the plurality of sets, $S_3$ to $S_N$, at a particular layer of the corresponding plurality of further layers, L3 to LN, only if at least a particular network element of a particular subset of network elements of a further set at a layer immediately preceding the particular layer is in an on state while one of the network elements at any of the corresponding plurality of further layers preceding the particular layer is in an off state. The network elements of the particular subset of the further set of network elements are connected to the particular network element of the plurality of set, $S_3$ to $S_N$, at the particular layer. Since chains of network elements having more than only two network elements may be powered off while at least a chain of network elements having more than only two network elements is turned on, the overall power consumption of the layered offload network 11, and of the correspondent communication processor 110 wherein the layered offload network 11 may be embedded, may be further reduced.

In the layered offload network 11 of FIG. 2 the adaptive power controller 51, similarly to the power controller 50 shown in FIG. 1, is configured to keep in an on state a chain of network elements through the layers L1 to LN if a power consumption of the chain is within a maximum power budget of the layered offload network 11. Said chain of network elements includes the last network element $E_{1N}$ at the last layer LN (or the only one network element of the second layer L2 in the embodiment above mentioned) and a series of network elements at layers preceding the last layer LN connected in series with the last network element $E_{1N}$.

Similarly to the example of FIG. 1, the chain of network elements of FIG. 2 may be turned off by the adaptive power controller 51 if a power consumption of the chain exceeds the maximum power budget of the layered offload network 11 and if all network elements of the chain were not already kept in an on state by the adaptive power controller 51 but turned on during an initialisation of the layered offload network 11. The adaptive power controller 51 ensures thus that a chain of network elements, that was previously approved and kept on by the adaptive power controller 51 because the power consumption of the chain was falling within the maximum power budget of the layered offload network 11, is not accidentally turned off at a later stage if another additional chain of network elements is not anymore approved by the adaptive power controller 51.

Figure 3:
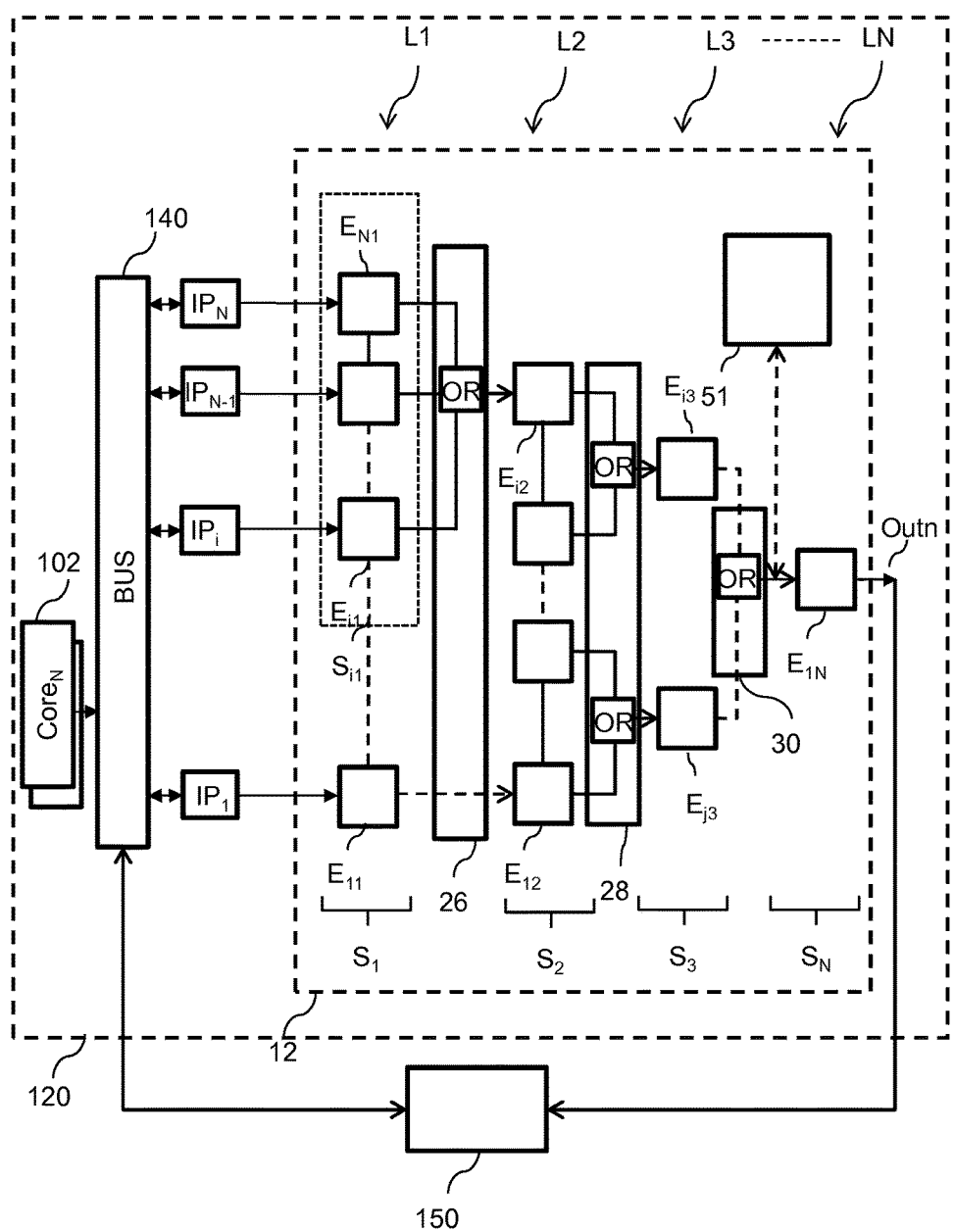

FIG. 3 shows a practical implementation of the powering controllers 25, 27 and 29 described in FIG. 2. The powering controllers 26, 28 and 30 shown in FIG. 2 include OR gates. For example the powering controller 26 includes an OR gate that has inputs receiving an on or an off state control signal from correspondent outputs of the network elements $E_{i1}$ of the particular subset $S_{i1}$ of network elements. The OR gate has an output to put on the particular network element $E_{i2}$ of the second set $S_2$ at the second layer L2 if any of the inputs of the OR gate receives an on state control signal which indicates an on state from the at least a particular network element $E_{i1}$ of said particular subset $S_{i1}$ of network elements at the first layer L1. It should be noted that the network elements $E_{i1}$ of the particular subset $S_{i1}$ are connected in series to the particular network element $E_{i2}$ of the second set $S_2$ at the second layer L2 to transfer the intermediate data from the first layer L1 to the particular network elements $E_{i2}$ of the second layer L2. These connections that refer to the data transfer have not been shown in FIG. 3 to simplify the drawing. In FIG. 3 only power control connections are shown between network elements at different layers. The power controllers 28 have OR gates with inputs receiving an on or an off state control signal from correspondent outputs of network elements of other particular subsets of network elements at the second layer L2. These latter OR gates have outputs to switch or keep in an on state further particular network elements $E_{i3}$, $E_{j3}$ of a third set $S_3$ of network elements at the third layer L3 if any of the inputs of these latter OR gates receives an on state control signal which indicates an on state from at least a further particular network element of said other particular subsets of network elements at the second layer L2. The network elements of said other particular subsets of network elements at the second layer L2 are connected to the further particular network elements $E_{i3}$, $E_{j3}$ to transfer the processed data from the second layer L2 to the further particular network elements $E_3$, $E_{j3}$ at the third layer L3. The powering controller 30 is arranged at an interface between the last network element $E_{1N}$ at the last layer LN and other network elements at another layer immediately preceding the last layer LN. The powering controller 30 includes only one OR gate because only one output may be required to control the unique last element $E_{1N}$ at the last layer LN.

The powering controllers 26, 28 and 30 shown in FIG. 3 which may be a practical implementation of the powering controllers 25, 27 and 29 shown in FIG. 2, may ensure that at least a chain of turned-on network elements from the first layer L1 to the last layer LN is established during the offload of data in the communication processor 120.

Figure 4:
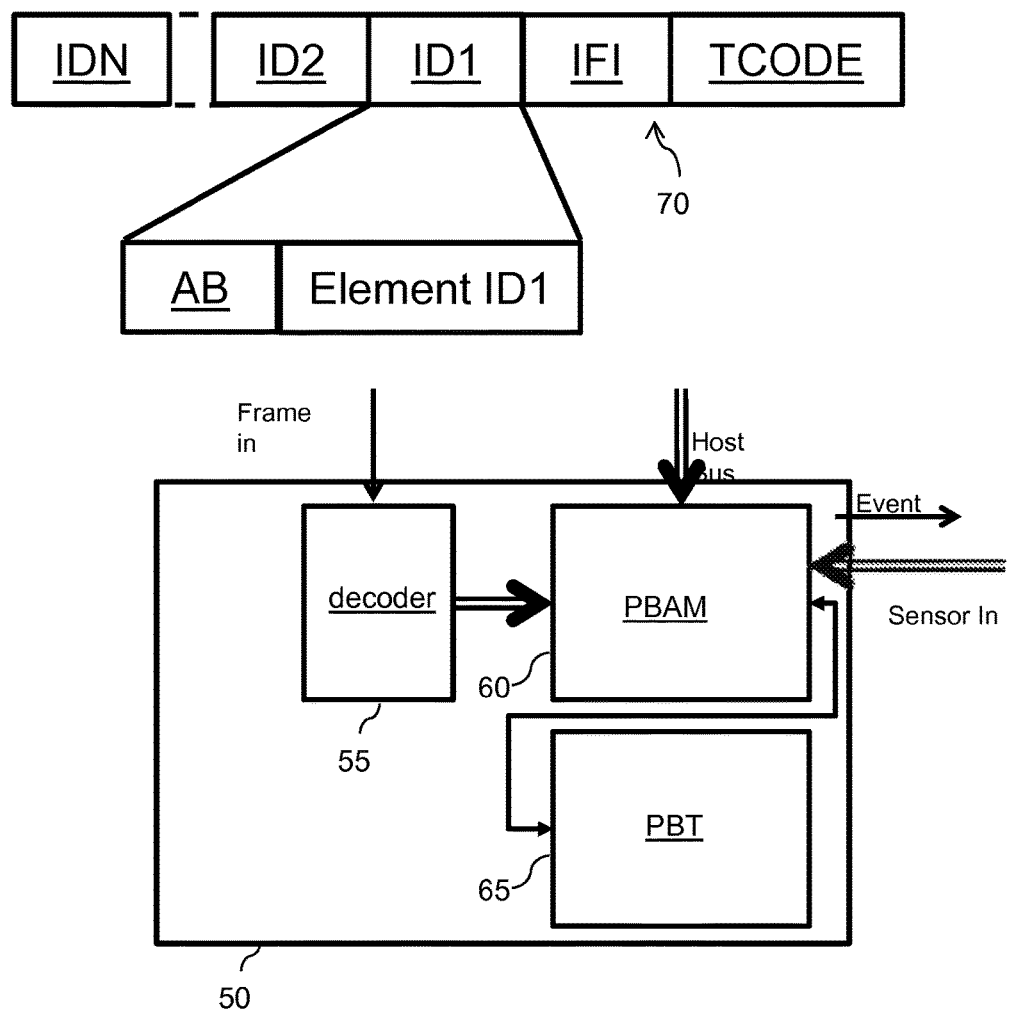

FIG. 4 shows an example of an implementation of the adaptive power controller 51 shown in FIG. 1 to FIG. 3. The adaptive power controller 51 includes a decoder to decode a coded frame 70 containing an identification code, ID1 to IDN, (every element in the layered network 11 or 12 adds its identification code) and an on or off state active bit AB for each network element of the layered network 11 or 12 that has processed the coded frame 70. An example of coded frame 70 processed by the network elements through the layers of the layered network 11 or 12 is illustrated in FIG. 4. The layered networks 11 or 12 may be initially powered by the one or more IP units, $IP_1$ to $IP_N$, shown through FIG. 1 to FIG. 3. The one or more IP units, $IP_1$ to $IP_N$, may send the coded frame 70 to power up the network elements at the first layer L1 of the layered network 11 or 12 of FIG. 2 or FIG. 3. A chain of network elements including at least a first network element of the first set $S_1$ and a second network element of the second set $S_2$ connected to the first network element is not activated until the coded frame 70 reaches the last network element $E_{1N}$ of the layered network 11 or 12. Along a path connecting the first network element $E_{i1}$ at the first layer L1 to the last network element $E_{1N}$ at the last layer LN, the coded frame 70 is processed and modified by each network element along the path. The coded frame 70 includes a transaction code TCODE to establish whether or not the coded frame 70 is associated with an offload functionality of the layered network 11 or 12. The coded frame 70 may be associated to a different functionality than the offload functionality of the layered network 11 or 12. For example the layered network 11 or 12 so far described as a layered offload network 11 or 12 may be working not only to offload data in the communication processor 100, 110 or 120 but also as a layered debug network to perform diagnostic or testing operations in the communication processor 100, 110 or 120 during a test mode of operation of the communication processor 100, 110 or 120. The layered debug network may for example be used to test the one or more IP units of the communication processor 100, 110 or 120 by providing, during a test mode of operation of the communication processor 100, 110 or 120, access to internal signals in the one or more IP units that would otherwise be not accessible during a normal mode of operation of the communication processor 100, 110 or 120. On the contrary, the layered offload network is operative in normal mode of operation because offload of data must happen when the one or more core processors 102 in the communication processor 100, 110 or 120 are overloaded, thereby improving the performance of the one or more core processors 102 during normal mode of operation. The coded frame 70 may thus be used to identify whether the layered network so far described is working as a layered offload network or as layered debug network by bringing this information in the transaction code TCODE. The coded frame 70 further includes a coded frame identifier IFI of the coded frame 70. The coded frame identifier IFI may be used to indicate for example if the coded frame 70 is a regular traffic frame or a request frame used to power up the first network element $E_{i1}$ at the first layer L1. The adaptive power controller 51 further includes a power budget table 65 that stores the identification code, ID1 to IDN, and a corresponding power consumption of the all network elements in the layered network 11 or 12. The power budget table may be for example a memory programmed table by software. The adaptive power controller 51 further includes a power budget algorithm unit 60 that receives the coded frame 70 decoded by the decoder 55. The power budget algorithm unit 60 further receives measurement data from sensors. The power budget algorithm unit 60 may be implemented with software instructions. The power budget algorithm unit 60 may calculate a current power consumption of the layered network 11 or 12 from measurement data of currently active chains of network elements. For example the sensors may detect currents or voltages or temperatures from which a total current power consumption of the layered network may be calculated. The power budget algorithm model unit 60 may also read and update the content of the power budget table 65 according for example to the measurement data retrieved by the sensors. The power budget algorithm model 60 may provide an output signal to instruct or not the offload of data via the chain of network elements that has been modifying the coded frame 70.

Figure 5:
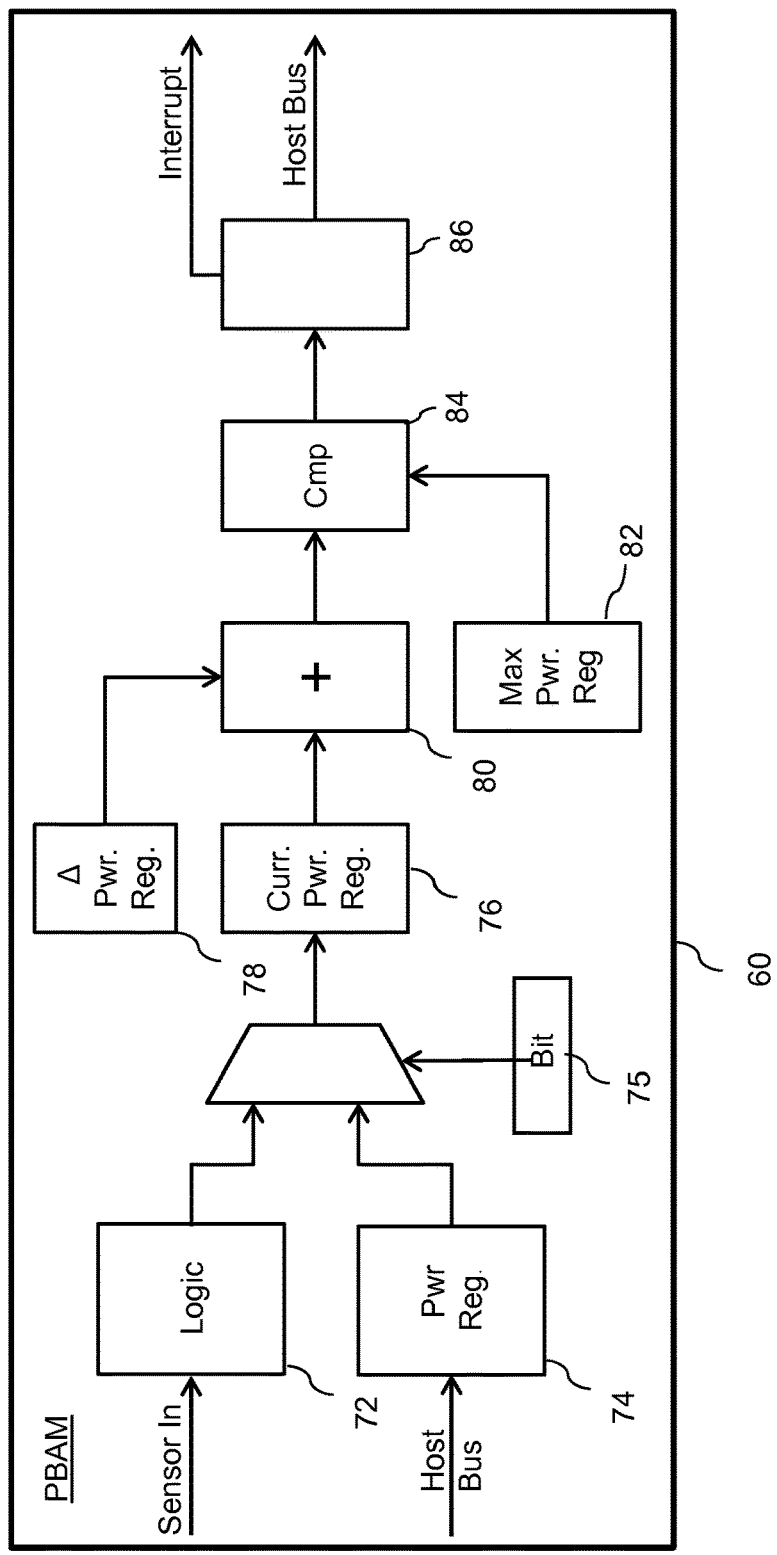

Referring to FIG. 5, the power budget algorithm unit 60 includes a conversion logic unit 72, a static power register 74, a current power consumption register 76, an offload delta power consumption register 78, an adder 80, a maximum power register 82, a comparator 84 and an event queue register 86. The conversion logic unit 72 converts the measurement data received from the sensors into the current power consumption. The conversion logic unit 72 calculates the current power consumption of the layered network 11 or 12 from the measurement data retrieved by the sensors. The static power register 74 stores an estimate of the current power consumption if no measurement data is available from the sensors, or if no sensors are used. In fact the sensors may not be implemented in which case an estimate of the current power consumption is taken based for example on the application in which the layered network 11 or 12 is used. The static power register 74 may be pre-programmed while acquisition of measurements data from the sensors may be dynamic. The current power consumption register 76 stores the current power consumption derived from the measurement data of the sensors or the estimate of the current power consumption stored in the static power register 74. A configuration bit 75, pre-configured by the user, determines whether the current power consumption derived from the measurement data of the sensors or the estimate of the current power consumption stored in the static power register 74 is used. The offload delta power consumption register 78 stores a delta power consumption of chains of network elements that have been activated in addition to currently active chains of network elements. The offload delta power consumption register 78 stores an extra power consumption of the newly activated chains of network elements compared to the already activated chains of network elements. The adder 80 adds up the current power consumption or the estimate of the current power consumption stored in the current power consumption register 76 to the delta power consumption to obtain a total power consumption. The comparator 84 compares a maximum allowed power budget stored in the maximum power register 82 with the total power consumption. Finally the event queue register 86 writes a first identification code of the corresponding first element of the additional activated chain of network elements to identify, in case the total power consumption has exceeded the maximum power budget, which chain may be turned off by the one or more IP units, $IP_1$ to $IP_N$, of the communication processor 110 or 120. In case the total power consumption has not exceeded the maximum power budget, the event queue register 86 will keep in an on state the related additional activated chains allowing the offload of data.

In the embodiments described with reference to the FIGS. 1, 2 and 3, the communication processor 100, 110 and 120 includes the layered network 10, 11 and 12 respectively. As said, alternatively the layered network 10, 11 or 12 may be external to the communication processor 100, 110 or 120. Furthermore an integrated circuit may integrate the layered network 10, 11 or 12 so far described or the communication processor 100, 110 or 120 including or excluding the layered network 10, 11 or 12.

Figure 6:
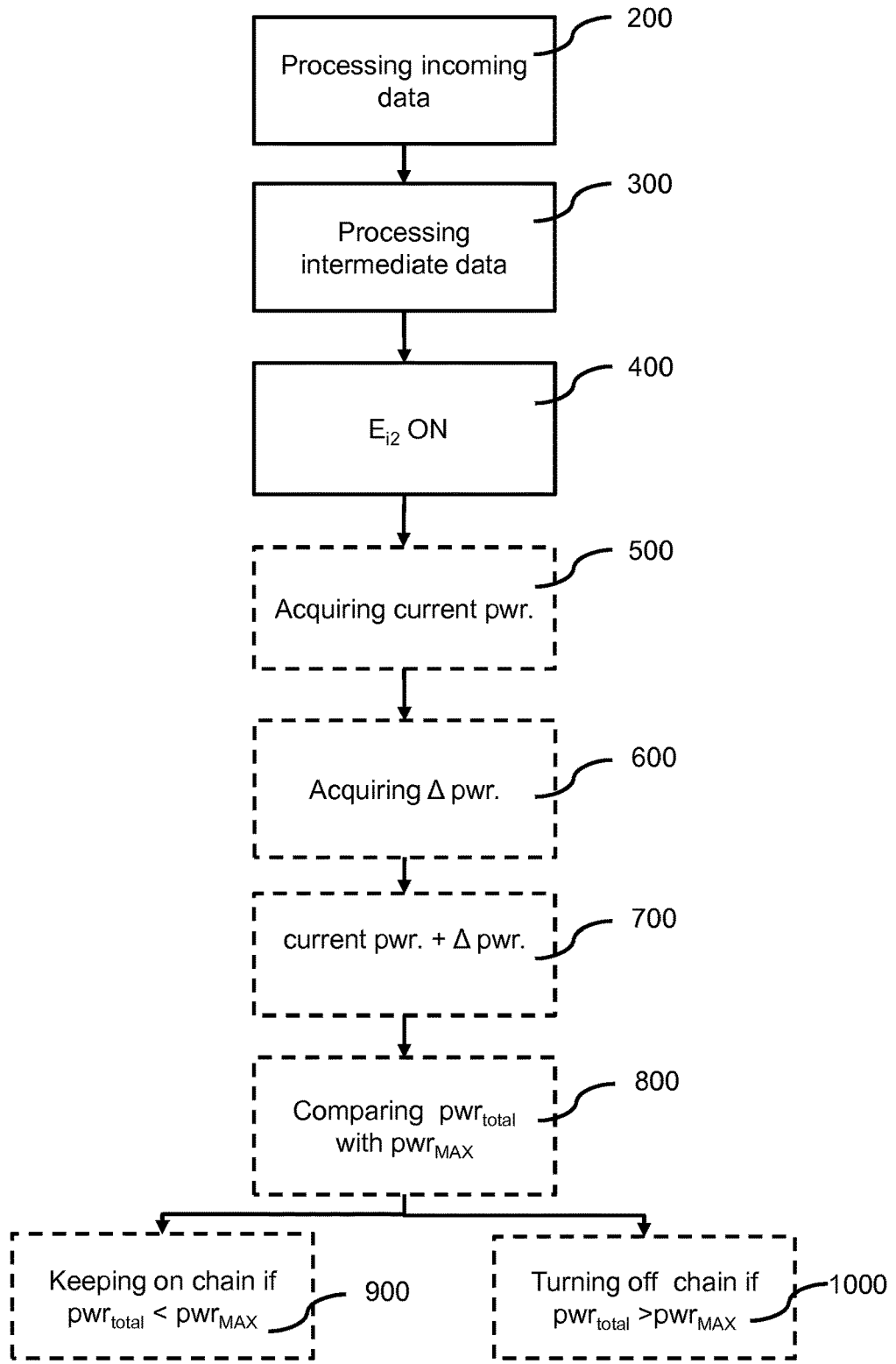

FIG. 6 shows a flow diagram of a method to control a layered network 10 in a communication processor 100. The layered network 10 and the communication processor 100 have been already both described with reference to FIG. 1 and their descriptions will be not repeated here below. In a first step 200 of the method, incoming data is processed by the network elements of the first set $S_1$. In a second step 300 intermediate data is processed by the one or more network elements of the second set $S_2$. The intermediate data is received from the network elements of the first set $S_1$. The method further includes: having in an on state 300 a particular network element $E_{i2}$ of the second set $S_2$ only if at least a particular network element $E_{i1}$ of the particular subset $S_{i1}$ of network elements of the first set $S_1$ at the first layer L1 is in an on state.

The method to control the layered network 10, after the step 400 of having on the particular network element $E_{j2}$ of the second set $S_2$, may include additional steps illustrated in the flow chart of FIG. 6 with dashed boxes. Acquisition 500 of a current power consumption of currently activated chains of network elements is performed. The chains of network elements at least include a network element of the first set $S_1$ and a network element of the second set $S_2$. Acquisition 600 of a delta power consumption of chains of network elements activated in addition to the currently activated chains of network elements is additionally performed. The method may further includes a step of adding 700 the current power consumption to the delta power consumption to obtain a total power consumption and comparing 800 the total power consumption with a maximum power budget of the layered network 10 to keep in an on state 900 the chains of network elements activated in addition to current chains of network elements if the total power consumption is lower than the maximum power budget or to turn off 1000 the chains of network elements activated in addition to the currently activated chains of network elements if the total power consumption is higher than the maximum power budget.

In one embodiment a computer program product (e.g. a software product) may include instructions that are run in a computer system to perform the steps of the method above described.

The computer system may be a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Also, devices functionally forming separate devices may be integrated in a single physical device. Also, the units and circuits may be suitably combined in one or more semiconductor devices. For example the layered network 10, 11 or 12 may be integrated in a single chip with all the remaining constituent parts of the communication processor 100, 110 and 120. Alternatively the layered network 10, 11 or 12 may be integrated in a separated chip to a chip in which all the remaining constituent parts of the communication processor 100, 110 and 120 may be integrated. However, other modifications, variations and alternatives are also possible. The specifications and drawings are, accordingly, to be regarded in an illustrative rather than in a restrictive sense. In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of controlling a layered network in a communication processor, the layered network comprising:
a first set of network elements at a first layer comprising a particular subset of network elements, and
a second set of one or more network elements at a second layer comprising a particular network element connected to only the network elements of the particular subset of network elements;
the method comprising:
processing incoming data by the network elements of the first set to obtain intermediate data,
processing the intermediate data by the one or more network elements of the second set,
having in an on state the particular network element of the second set only if at least a particular network element of the particular subset of network elements of the first set at the first layer is in an on state and one of the network elements of the first set is in an off state,
acquiring a current power consumption of the layered network of currently activated chains of network elements, the chains comprising at least a first network element of the first set and a second network element of the second set connected to the first network element,
acquiring a delta power consumption of additional activated chains of network elements activated in addition to current chains of network elements activated during the current operation of the layered network, adding the current power consumption to the delta power consumption to obtain a total power consumption, comparing the total power consumption with a maximum power budget of the layered network, storing a first identification code of a corresponding first network element of the additional activated chains in an event queue register, keeping in an on state the additional activated chains of network elements if the total power consumption is lower than the maximum power budget, and turning off the additional activated chains of network elements if the total power consumption is higher than the maximum power budget.

2. A computer program product comprising instructions for causing a computer system to perform the method according to the claim 1.

* * * * *